Sept. 13, 1927.
E. C. NORTON
BLUBBER SLICING IMPLEMENT
Filed Aug. 27, 1926
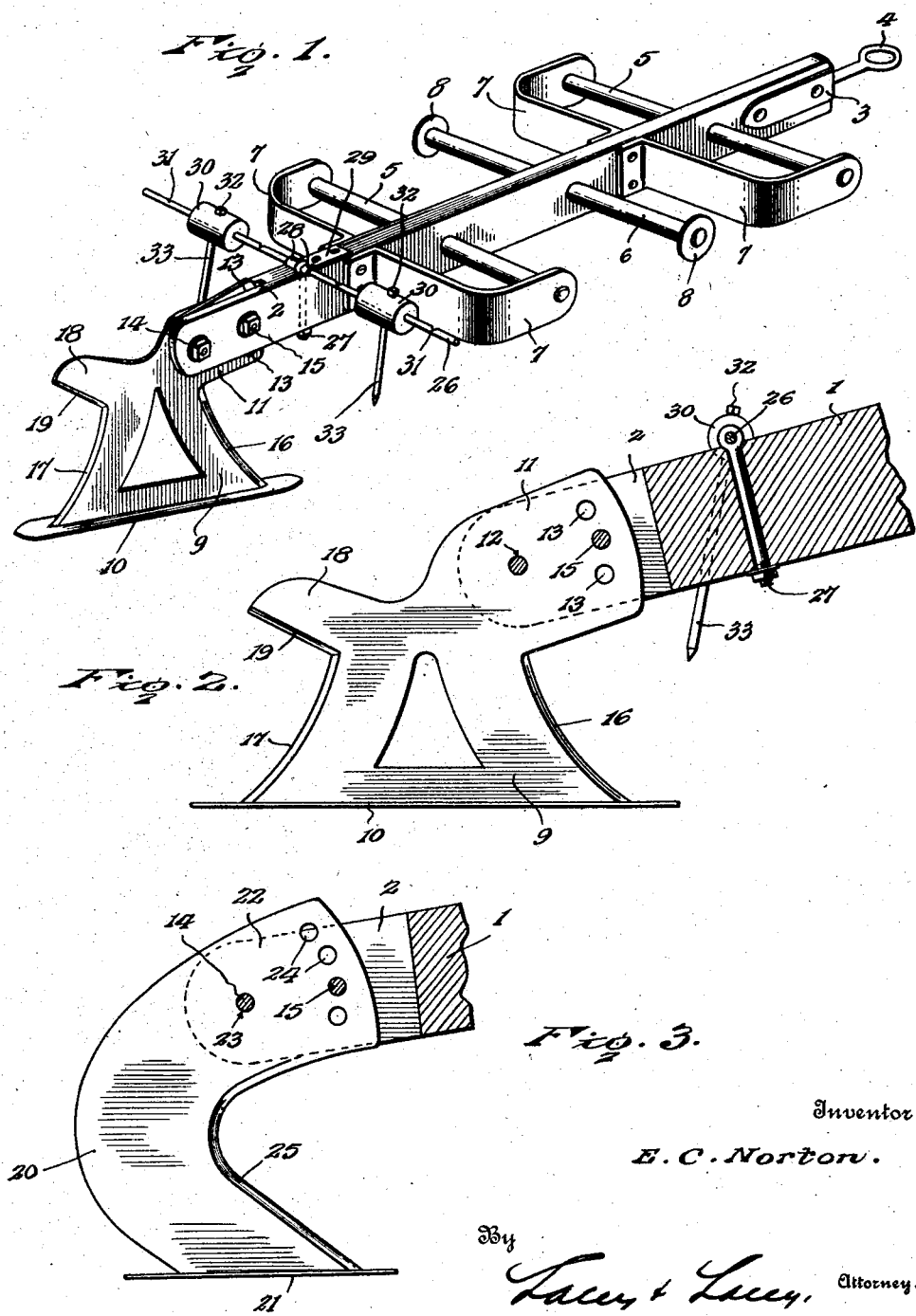

Patented Sept. 13, 1927.

1,642,625

UNITED STATES PATENT OFFICE.

EDWIN C. NORTON, OF ARCATA, CALIFORNIA.

BLUBBER-SLICING IMPLEMENT.

Application filed August 27, 1926. Serial No. 131,961.

This invention relates to an implement for removing blubber from whales and one object of the invention is to provide an implement of this character by means of which blubber upon a whale's body may be cut into strips preparatory to removing it from the whale.

Another object of the invention is to provide the implement with a handle resembling a draft beam, and by means of which a blade carried thereby may be easily drawn through the blubber.

Another object of the invention is to so construct the handle or draft beam that it may be easily grasped by workmen at opposite sides of it and either a pulling or a pushing action exerted.

Another object of the invention is to provide the implement with a cutting blade depending from one end of the handle and adapted to be swung vertically to an adjusted position and releasably secured.

Another object of the invention is to so form the blade that it may readily cut the blubber into strips and also extend beneath the blubber and loosen it at opposite sides of the cut.

Another object of the invention is to permit a blade applied to the handle or draft beam to be removed and one of a modified form substituted therefor.

The invention is illustrated in the accompanying drawing, wherein,—

Figure 1 is a perspective view of the improved blubber removing implement

Figure 2 is a fragmentary view showing the blade in side elevation and a portion of the draft beam, or handle, in longitudinal section.

Figure 3 is a view similar to Figure 2 showing a modified form of blade connected with the handle.

The handle or draft beam 1 of the improved blubber removing implement may be formed of wood or any suitable material, which will be strong and at the same time, light in weight so that it may be readily handled. At one end the draft beam is formed with a longitudinally extending slot 2 and at its other or forward end the draft beam carries a clevis 3 provided with an eye 4 so that a tractor or a cable wound upon a power operated drum may be engaged with the draft beam to move the implement forwardly. Since it is intended to have the implement usually operated by hand there has been provided bars 5 which project transversely from opposite sides of the draft beam and an intermediate bar 6. The bars 5 and 6 are spaced from each other longitudinally of the draft beam and the bars 5 are braced by strips 7 preferably formed of metal and having their inner ends secured to opposite side faces of the draft beam rearwardly of the bars and their forward ends secured upon the outer end portions of the bars. Disks 8 are secured upon the outer end portions of the bars 6 to take the place of the strips 7 and prevent the hands readily slipping out of engagement with the bars when the implement is in use. It will be understood that if desired strips could also be provided for the bars 6 or the bars 5 provided with abutment disks similar to the disks 8. It will be readily understood that when the machine is in use one or more men may stand at opposite sides of the draft beam and by grasping the bars, drag the implement forwardly.

The blade 9 which is shown in Figures 1 and 2 is formed of strong tempered metal and at its bottom carries a shoe 10 which is also formed of metal and projects from the sides of the blade and also projects forwardly and rearwardly therefrom. The blade extends vertically and at its upper end is provided with a forwardly extending arm 11 having openings 12 and 13, formed therein. The arm is of a thickness to fit into the slot 2 formed in the draft beam and is pivotally held therein by a bolt or other suitable fastener 14 passed transversely through the draft beam. The openings 13 are spaced vertically along an arcuate path having the opening 12 as its center and are intended to receive a bolt or other removable fastener 15 passed transversely through the draft beam in advance of the bolt 14. By referring to Figure 2, it will be readily seen that by passing the bolt 15 through a selected opening 13 the angle of the draft beam with respect to the blade may be controlled and the draft beam caused to extend at an incline most convenient to the men operating the implement. The forward edge of the blade between the arm and shoe 10 is sharpened, as shown at 16 and the rear edge is also sharpened, as shown at 17 between the shoe and a prong or arm 18 which projects rearwardly opposite the arm 11 and preferably at an upward incline. The lower edge of the prong 18 is sharpened, as shown at 19 and its upper edge is curved downwardly at its free end to intercept the sharpened lower edge and provide the prong with a tapered free end.

In Figure 3 there has been shown a blade 20 which may be substituted for the blade 9. This blade is also formed of tempered metal and at its lower end carries a shoe 21 corresponding to the shoe 10 and projecting from the sides and forward and rear ends of the blade. The blade extends upwardly at a rearward incline and is then curved forwardly and merges into a forwardly extending end portion 22 corresponding to the arm 11 and adapted to fit into the slot 2 of the draft beam. The arm or forwardly extending portion 22 of the blade is formed with openings 23 and 24 corresponding to the openings 12 and 13, and respectively adapted to receive the bolts 14 and 15. The sharpened forward edge 25 of the blade 20 extends partially along the lower edge of the arm 22 so that a very good slicing action will take place when the blade is in use. In this form, the blade is not provided with a sharpened rear edge and is also not provided with a rearwardly extending prong. While I have shown two blades which may be selectively used it will be understood that other specific forms of blades may be employed. It will also be obvious that if desired, the shoe extending along the lower end of the blade may be omitted.

When the implement is in use the blade is embedded in the blubber of the whale at one end thereof with the draft beam extending longitudinally of the whale. If desired, an incision may be first made by means of the rearwardly extending prong so that the blade may initially occupy its proper position in the blubber. After the blade has been properly embedded in the blubber, the operators grasp the handle bars and draw the implement forwardly. The blade will of course, cut its way through the blubber and the shoe will serve, not only to prevent it from readily striking against ribs or other obstructions, but also serves to cut at opposite sides of the bottom of the slit and thus, partially loosen the blubber so that it may be more readily dragged off of the whale by a suitable grapple.

After the first cut or slice has been made in the blubber, longitudinally of the whale, a second cut is made in spaced relation to the first cut, and this is repeated until the blubber has been cut into a number of longitudinally extending strips which are then individually engaged by a suitable grapple, and drawn loose from the body of the whale. The strips should be of the same width and therefore, each cut or slit must extend parallel to the first slit and at the same distance from it throughout its length. In order to accomplish this there has been provided a gage which consists of a rod or bar 26 and markers carried thereby. The rod or bar extends transversely across the draft beam adjacent its rear end and is firmly held in place by an eye bolt 27 so that it can not turn in the sleeves 28 formed upon its mounted plate or bracket 29. Blocks 30 are slidably mounted upon the bar 26 and the bar is formed with indicating notches 31 so that proper spacing of the blocks may be readily obtained. After the blocks have been moved to the proper positions along the rod or bar the set screws 32 are tightened and the blocks will be firmly held in place. Rods or fingers 33 which terminate in sharpened ends project radially from the blocks and the blocks are preferably secured upon the rod to cause the fingers to extend downwardly at a rearward incline. After the first cut or slice has been made in the blubber, the finger at one side of the implement is placed in the slit already made and as the implement is drawn forwardly, this finger will cause the new slit to be formed parallel and in proper spaced relation to the first slit. The other finger will serve to mark the place for the next cut. It will thus be seen that after the second cut has been made the implement may be guided both by means of the finger which fits into a previously made slit and by the operator taking pains to have the blade follow the line marked upon the whale while the slit just finished was made. As previously explained, a rope wound upon a power operated drum or attached to a tractor could be hooked into the eye 4 so that it would not be necessary to manually draw the implement forwardly.

Having thus described the invention, I claim:

1. A blubber removing implement comprising a draft beam, a blubber cutting blade disposed vertically below said draft beam and pivotally connected therewith for vertical swinging movement longitudinally of the draft beam to adjusted positions, and means for releasably securing said blade in an adjusted position.

2. A blubber removing implement comprising a draft beam, a blubber cutting blade disposed vertically below said draft beam and having a vertically disposed sharpened edge, an arm extending forwardly from the upper portion of said blade, a pin passed through said arm and draft beam to mount the blade for vertical swinging movement longitudinally of the draft beam to adjusted positions, and means to releasably secure said blade in an adjusted position.

3. A blubber removing implement comprising a draft beam, a blubber cutting blade disposed vertically below said draft beam and having a vertically disposed sharpened edge, an arm extending forwardly from the upper portion of said blade, and formed with a pin receiving opening and vertically spaced fastener receiving openings, said draft bar being provided with a slot to receive said arm and having openings to register with the openings in the arm, a pin passed through the registering pin receiving openings to mount said blade for vertical adjustment, and a removable fastener fitted in the fastener receiving openings to releasably secure the blade in an adjusted position.

4. A blubber removing implement comprising a draft beam, a blubber cutting blade disposed below said draft beam and having a vertically disposed portion, an arm extending substantially horizontally from the vertically disposed portion in a vertical plane and fitted into a slot formed longitudinally in said draft beam, a pin passed through said beam and arm to pivotally mount said blade for vertical swinging to adjusted positions, and a removable fastener passed through said beam and arm to releasably secure the blade in an adjusted position.

5. A blubber removing implement comprising a draft beam, a blubber cutting blade disposed below said draft beam and having a vertically disposed portion formed with a sharpened forward edge, an arm extending forwardly from the vertically disposed portion above its sharpened edge, a shoe extending longitudinally of said blade and secured along its lower edge with portions projecting forwardly and rearwardly therefrom, and means to secure said arm to the rear portion of said draft beam.

6. A blubber removing implement comprising a draft beam, a blubber cutting blade disposed below said draft beam and having a vertically disposed portion formed with sharpened forward and rear edges, arms extending forwardly and rearwardly from said blade above its sharpened edges, the rear arm being tapered and sharpened along its lower edge, means to pivotally connect the forward arm with said draft beam and mount the blade for vertical swinging to adjusted positions, and means to releasably secure the blade in an adjusted position.

In testimony whereof I affix my signature.

EDWIN C. NORTON. [L. S.]